US012251947B2

(12) United States Patent
Liao

(10) Patent No.: US 12,251,947 B2
(45) Date of Patent: Mar. 18, 2025

(54) STEEL STAMPING TOOL AND OPERATIONAL METHOD FOR OPERATING THE STEEL STAMPING TOOL

(71) Applicant: Ying-Che Liao, Taichung (TW)

(72) Inventor: Ying-Che Liao, Taichung (TW)

( * ) Notice: Subject to any disclaimer, the term of this patent is extended or adjusted under 35 U.S.C. 154(b) by 200 days.

(21) Appl. No.: 18/134,540

(22) Filed: Apr. 13, 2023

(65) Prior Publication Data

US 2023/0249473 A1 Aug. 10, 2023

Related U.S. Application Data

(63) Continuation-in-part of application No. 17/515,669, filed on Nov. 1, 2021, now abandoned.

(51) Int. Cl.
*B21D 37/04* (2006.01)
*B41J 3/39* (2006.01)

(52) U.S. Cl.
CPC ................ *B41J 3/39* (2013.01); *B21D 37/04* (2013.01)

(58) Field of Classification Search
CPC .......... B65D 51/24; B65D 1/22; B21D 22/02; B21D 37/04
USPC .......................................................... 206/372
See application file for complete search history.

(56) References Cited

U.S. PATENT DOCUMENTS 1,965,814 A * 7/1934 Van Cantfort .......... B44B 11/04 101/28
2,140,670 A * 12/1938 Donbeck ................ B21D 37/20 101/4
2,392,804 A * 1/1946 Basolo .................... B29C 39/10 425/DIG. 29
2,655,099 A * 10/1953 Rickenbach ............ B44B 11/04 101/28
3,116,683 A * 1/1964 Krembel, Jr. ........... B44B 5/026 101/381
3,273,701 A * 9/1966 Friedman ............... B65D 85/20 206/214
4,090,599 A * 5/1978 Kelly ...................... B44B 5/026 101/4
4,422,783 A * 12/1983 Houk ...................... B44B 11/04 400/140
4,437,400 A * 3/1984 Ellis ...................... B44B 5/0061 269/211
9,596,930 B2 * 3/2017 VanHeusden ........ A47B 96/025
9,610,680 B2 * 4/2017 Diamond ............... B25H 3/003
D789,087 S * 6/2017 Harrah ........................... D3/905
9,808,931 B2 * 11/2017 Vasquez, III .......... B25H 3/023
9,878,440 B2 * 1/2018 Da Rosa ................ B25H 3/003
10,279,464 B1 * 5/2019 Wilshaw ................ B25H 3/003
10,618,717 B2 * 4/2020 Kneisel ..................... B01L 9/06
(Continued)

*Primary Examiner* — Ernesto A Grano

(57) ABSTRACT

A steel stamping tool includes a base and a cover removably mounted to the top of the base. Multiple stamps are accommodated in an accommodating space form between the base and the cover. The cover includes an extension extending from one of two ends of the cover, and at least one passage is defined vertically through the extension. The cover is removed from the base and the one stamp is picked from the accommodation space and inserted through the at least one passage. The stamp in the passage is not radially rotatable. A work end of the stamp is located in the concaved space and contacts an object. By striking a striking end of the stamp that is exposed on the top face of the extension, the work end of the stamp embosses the object.

6 Claims, 11 Drawing Sheets

(56) References Cited

U.S. PATENT DOCUMENTS

| | | | | | |
|---|---|---|---|---|---|
| D899,020 | S * | 10/2020 | Shiflett, Jr. | D8/71 | |
| 10,987,205 | B2 * | 4/2021 | DeBord | A61B 50/31 | |
| 11,110,589 | B2 * | 9/2021 | Hurley | H01F 7/0252 | |
| 2005/0242145 | A1 * | 11/2005 | Wang | A45F 5/021 | 224/269 |
| 2012/0006836 | A1 * | 1/2012 | Chen | B65D 1/22 | 220/694 |
| 2016/0015208 | A1 * | 1/2016 | Pallotto | A47J 36/06 | 220/573.1 |
| 2017/0297083 | A1 * | 10/2017 | Rao | B21J 13/02 | |
| 2020/0095029 | A1 * | 3/2020 | Pehar | C02F 1/003 | |
| 2022/0297203 | A1 * | 9/2022 | Valentine | B23B 41/12 | |

* cited by examiner

STEEL STAMPING TOOL AND OPERATIONAL METHOD FOR OPERATING THE STEEL STAMPING TOOL

1. Fields of the Invention

The present invention is a Continuation-In-Part patent application of the patent application with the application Ser. No. 17/515,669.

BACKGROUND OF THE INVENTION

2. Descriptions of Related Art

U.S. Pat. No. 3,273,701 to Friedman discloses a display container with a base and a cover, and the items to be displayed can be accommodated in the base. U.S. Pat. No. 9,596,930 to VanHeusden discloses an add-on storage caddy which is removably attached to a body and has an open top, and a tool ledge protrudes from the front of the caddy. The tool ledge includes multiple holes for positioning tools. U.S. Pat. No. 2,655,099 to Rickenbach discloses a stamp holder for embossing dies and includes a handle connected to the stamp holder. The stamp holder includes multiple holes for positioning the stamps.

The above mentioned display container and the add-on storage caddy are not related to stamping tools. The stamp holder to Rickenbach lacks a storage space for the stamps. The user has to hold the stamp holder and maintains the stamp holder at desired position above the object, and then strike the stamps. It is noted that the handle of the stamp holder is located higher than the holder and the stamps protruded from the underside of the holder, when aiming the stamps toward the object, the stamp holder does not rest on any surface, the user's hand may shake and unstable, the stamp cannot precisely emboss the object as desired.

The present invention intends to provide a steel stamping tool and an operational method for a steel stamping tool to eliminate the shortcomings mentioned above.

SUMMARY OF THE INVENTION

The present invention relates to a steel stamping tool and comprises a base and a cover which is removably mounted to the top of the base to form an accommodation space between the base and the cover. Multiple stamps are accommodated in the accommodating space. Each of the stamps includes a striking end and a work end. The cover includes an extension extending from one of two ends of the cover. The extension has at least one passage defined vertically therethrough. Two holding faces are formed on two opposite sides of the cover, and a top face is formed to a top of the cover. The cover has an open bottom which is located opposite to the top face of the cover. A concaved space is formed between the open bottom and the extension.

The cover is removed from the base. One of the stamps is removed from the accommodation space and inserted through the at least one passage. The stamp is not radially rotatable and is in a positioned status in the passage. The work end of the stamp extends beyond the at least one passage and is located in the concaved space. The open bottom of the cover is rested on an object, and the work end of the stamp extends contacts an object.

The present invention also provides an operational method for a steel stamping tool, and comprises the following steps:

separation of the cover: removing the cover with an extension extending from one end of the base, the extension having at least one passage defined vertically therethrough;

positioning of the cover: movably positioning the cover and locating the extension above an object, a gap formed between the extension and the object;

removing a stamp: removing a stamp from the base;

inserting the stamp through the at least one passage: inserting the stamp through the at least one passage, the stamp being not radially rotatable within the passage, a work end of the stamp located in the concaved space;

aiming: holding the cover and moving the cover along the object until the work end of the stamp in the passage aligned with a processing area of the object, and striking: striking a striking end of the stamp that is exposed on the top face of the extension, and the work end of the stamp in the at least one passage embosses the processing area of the object.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
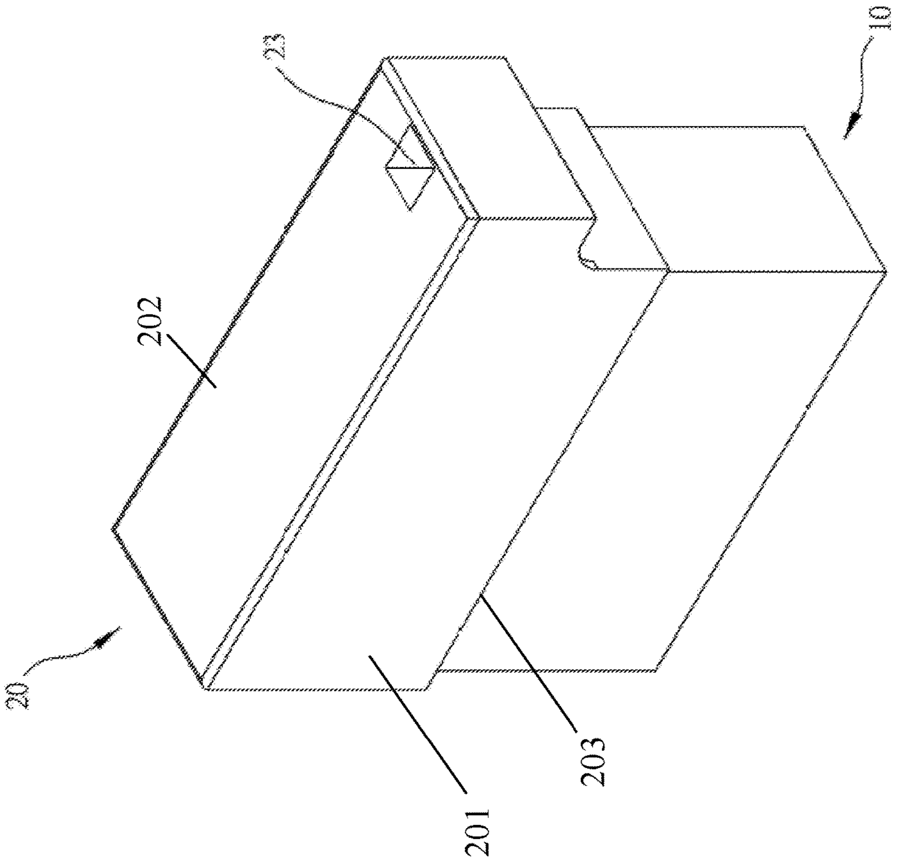
FIG. 1 is a perspective view to show the steel stamping tool of the present invention.
Figure 2:
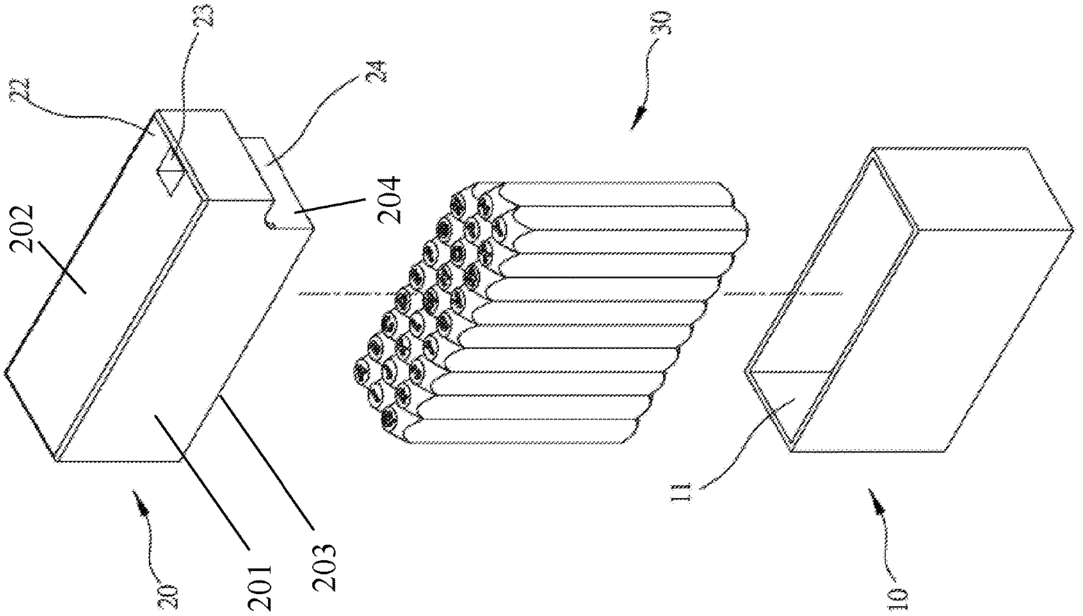
FIG. 2 is an exploded view of the steel stamping tool of the present invention.
Figure 3:
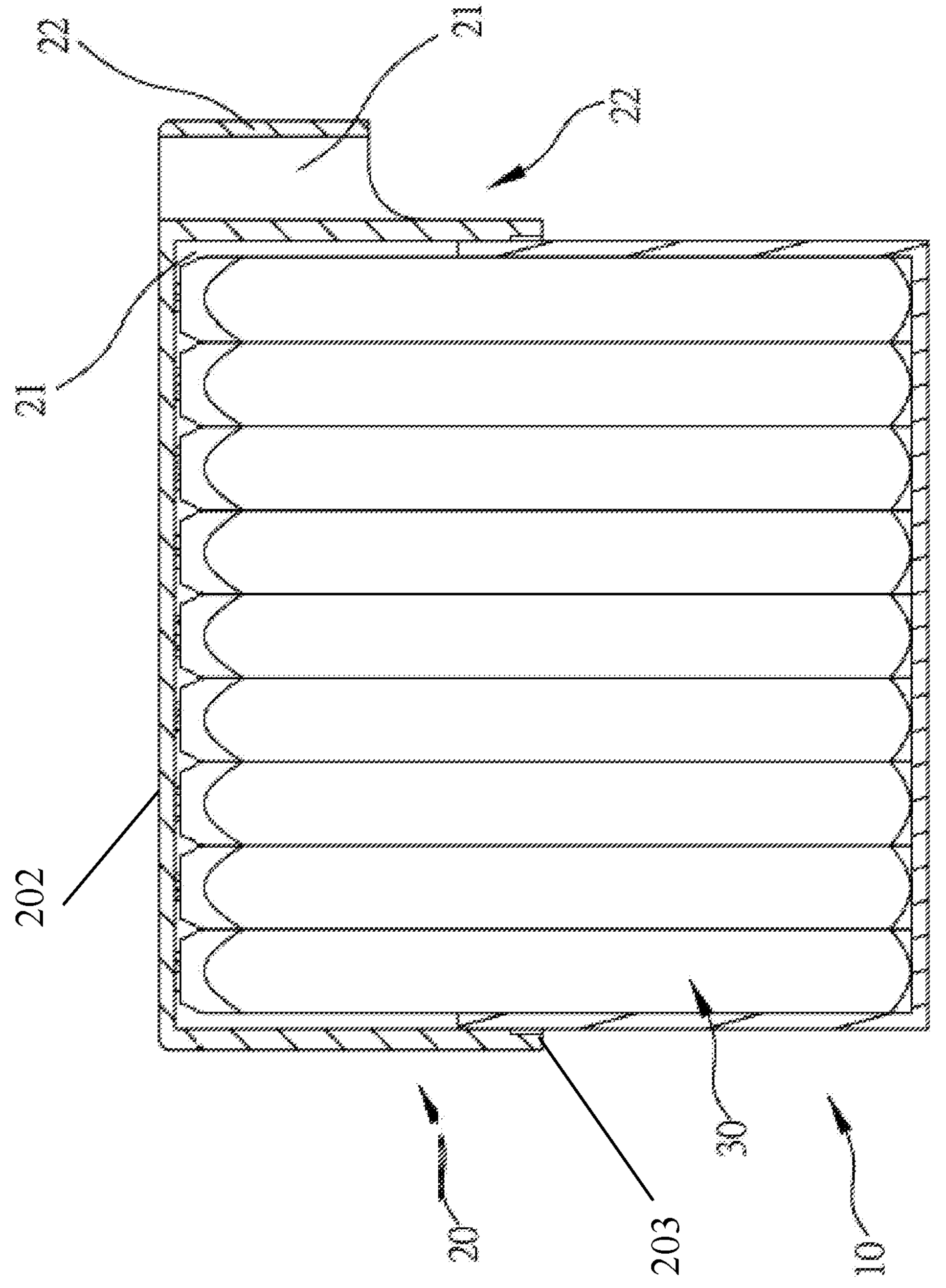
FIG. 3 is a cross sectional view of the steel stamping tool of the present invention.

Referring to FIGS. 1 to 3, the steel stamping tool of the present invention comprises a base 10 and a cover 20 which is removably mounted to the top of the base 10 to form an accommodation space between the base 10 and the cover 20. Multiple stamps 30 are accommodated in the accommodating space. Each stamp 30 includes a striking end and a work end which is located opposite to the striking end and has characters, patterns or the like. The cover 2 includes an extension 22 extending from one of two ends of the cover 20, and the extension 22 has a passage 23 defined vertically therethrough. The extension 22 protrudes beyond the base 10 when the cover 20 is mounted to the base 10. Two holding faces 201 are formed on two opposite sides of the cover 20, and a top face 202 is formed to the top of the cover 20. Furthermore, the cover 20 has an open bottom 203 which is located opposite to the top face 202 of the cover 20. A concaved space 24 is formed between the open bottom 203 and the extension 22. The cover 20 further includes an end face 204 that faces the concaved space 24.

Figure 4:
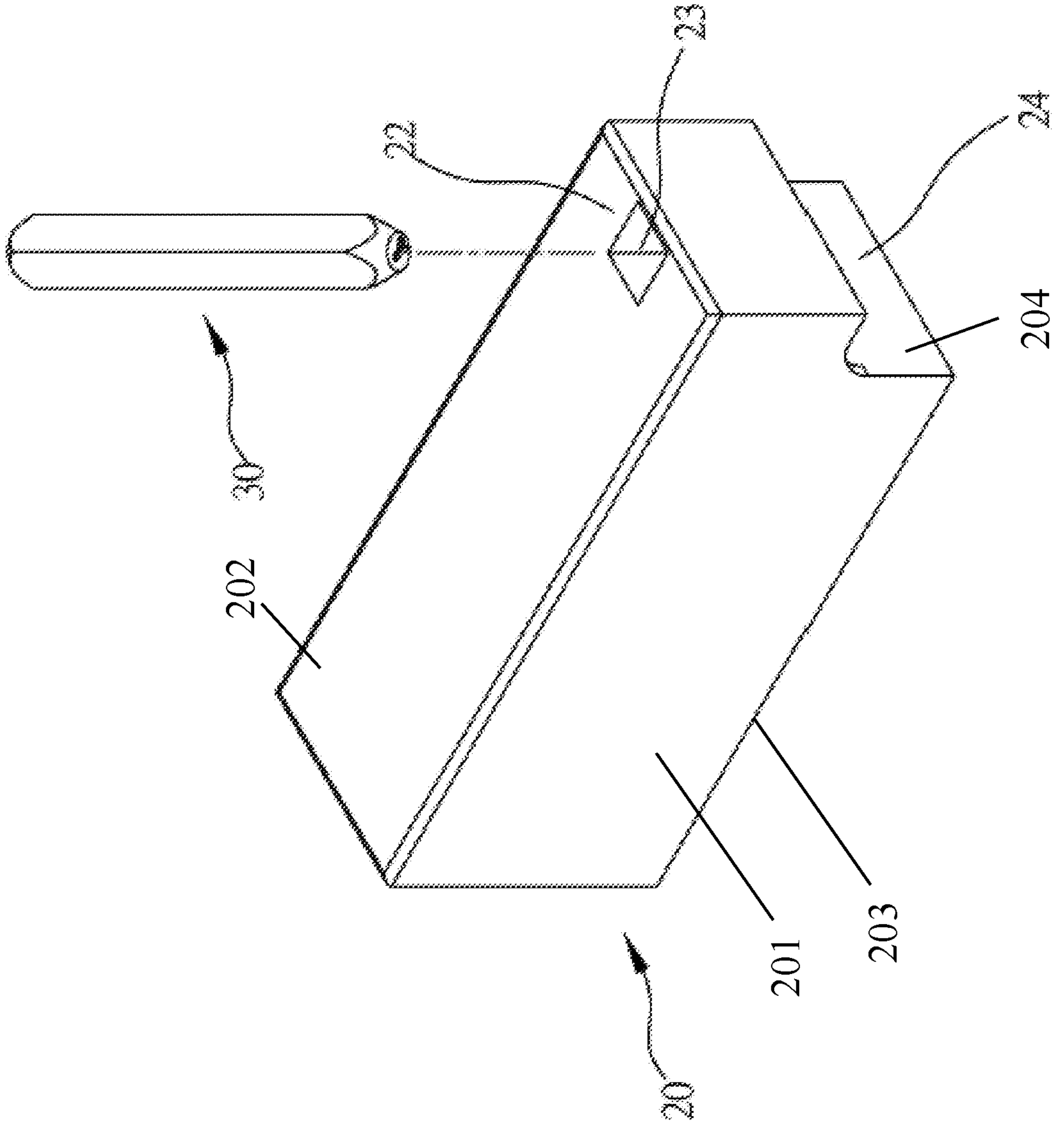
FIG. 4 shows that on stamp is to be extended through the passage of the extension of the cover.
Figure 5:
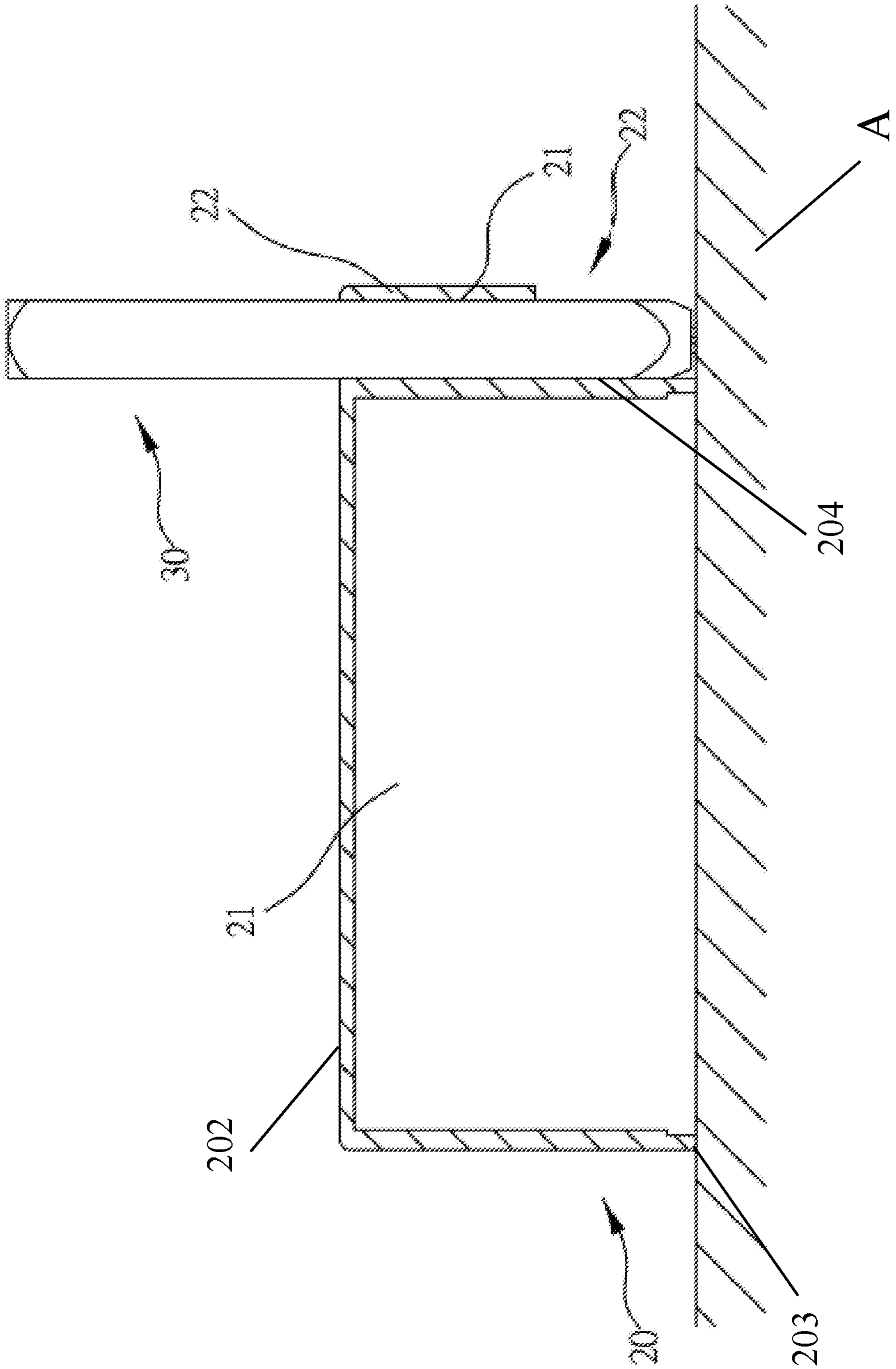
FIG. 5 is a cross sectional view to show that the cover is put on an object and the work end of the stamp contacts the object.
Figure 10:
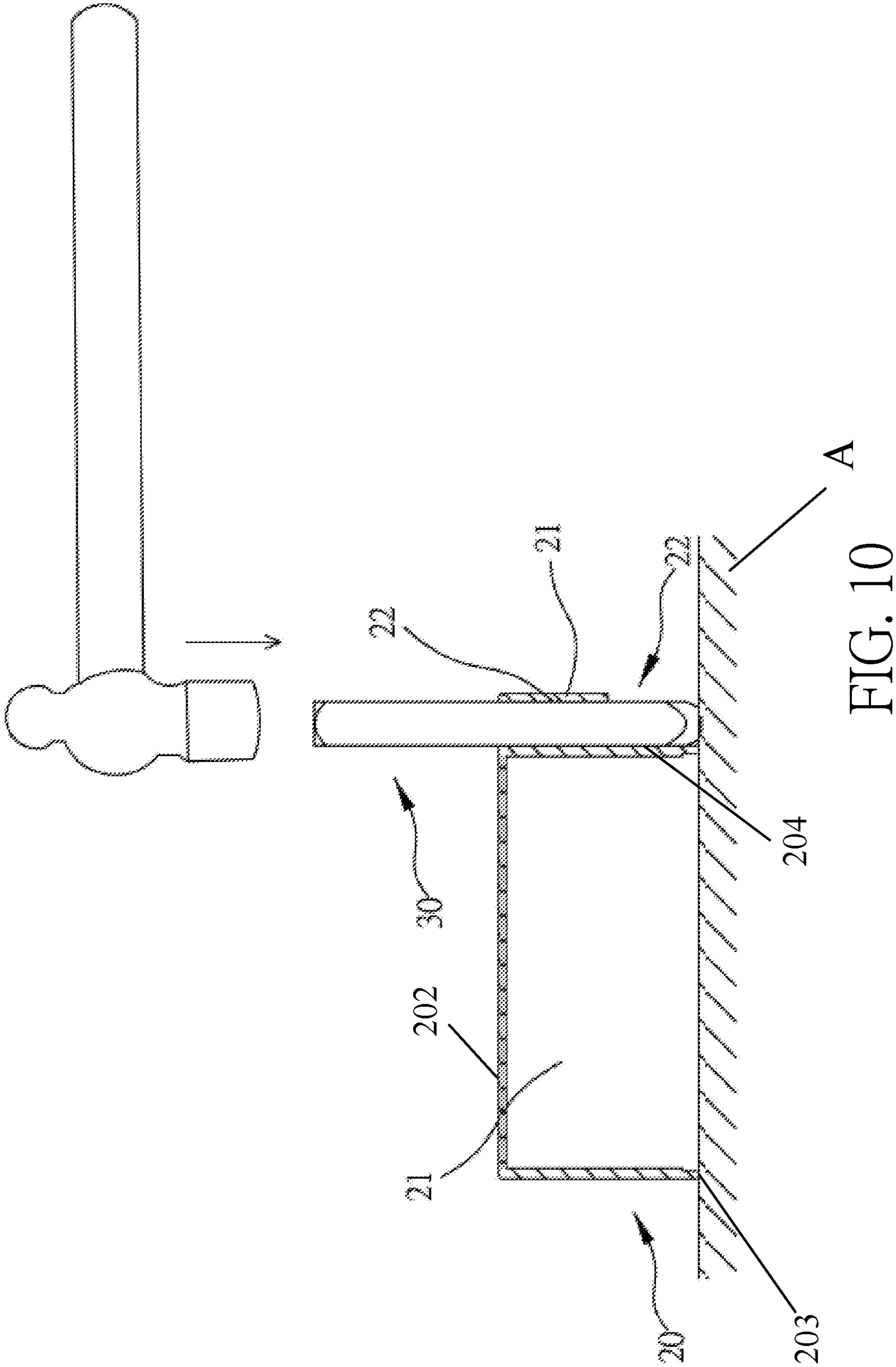
FIG. 10 shows a hammer is used to strike the striking end of the stamp.

As shown in FIGS. 4 and 5, when in use, the cover 20 is picked and removed from the base 10 and one of the stamps 30 is removed from the accommodation space. The picked stamp 30 is inserted through the passage 23. The stamp 30 in the passage 23 is not radially rotatable and is in a positioned status. In this embodiment, the passage 23 is a rectangular passage and the stamp 30 has a rectangular cross section. The user holds the holding faces 201 of the cover 20 and rests the open bottom 203 of the cover 20 on an object "A" which can be a piece of metal sheet or paper. The cover 20 is moved along the object "A" until the work end of the stamp 30 extending through the passage 23 is located in the concaved space 24 and contacts the processing area of the object "A". The axial length of the passage 23 is greater than the height of the concaved space 24, so that the stamp 30 in the passage 23 is positioned stably and the user can easily check the position of the work end relative to the object "A" via the concaved space 24. As shown in FIG. 10, the user uses a hammer to strike the striking end of the stamp 30 to emboss the object "A" by the work end.

It is noted that the cover 20 is rested on the object "A" by the open bottom 203 when in use, so that the user does not need to hold the cover 20 in the air to prevent the user's hand from shaking and vibrating. When the cover 20 is moved to a desired position along the object "A", the stamp 30 is aligned with the processing area of the object "A" and is able to precisely stamp the characters onto the object "A".

Figure 6:
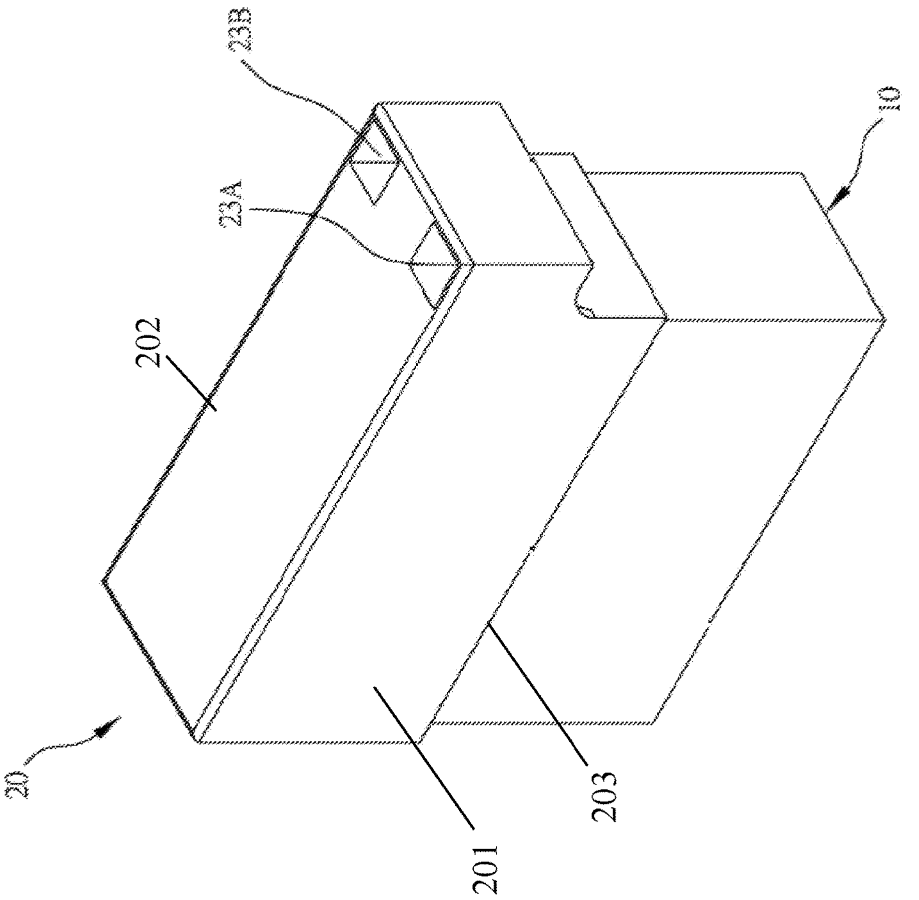
FIG. 6 is a perspective view to show a second embodiment of the steel stamping tool of the present invention.
Figure 7:
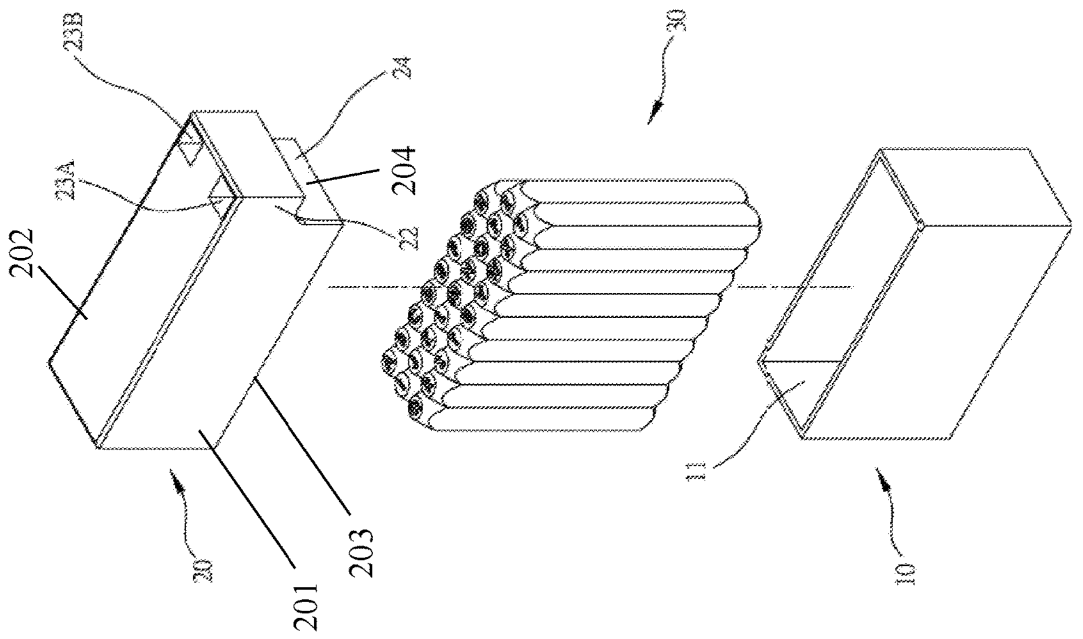
FIG. 7 is an exploded view of the steel stamping tool in FIG. 6.
Figure 8:
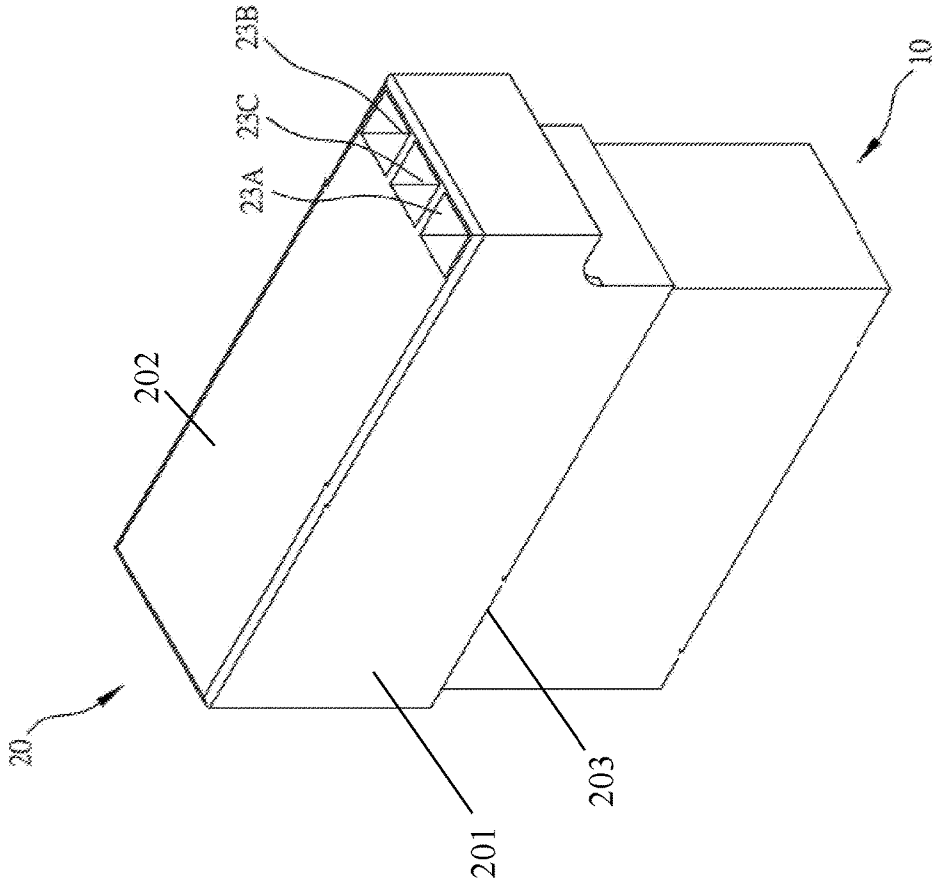
FIG. 8 is a perspective view to show a third embodiment of the steel stamping tool of the present invention.
Figure 9:
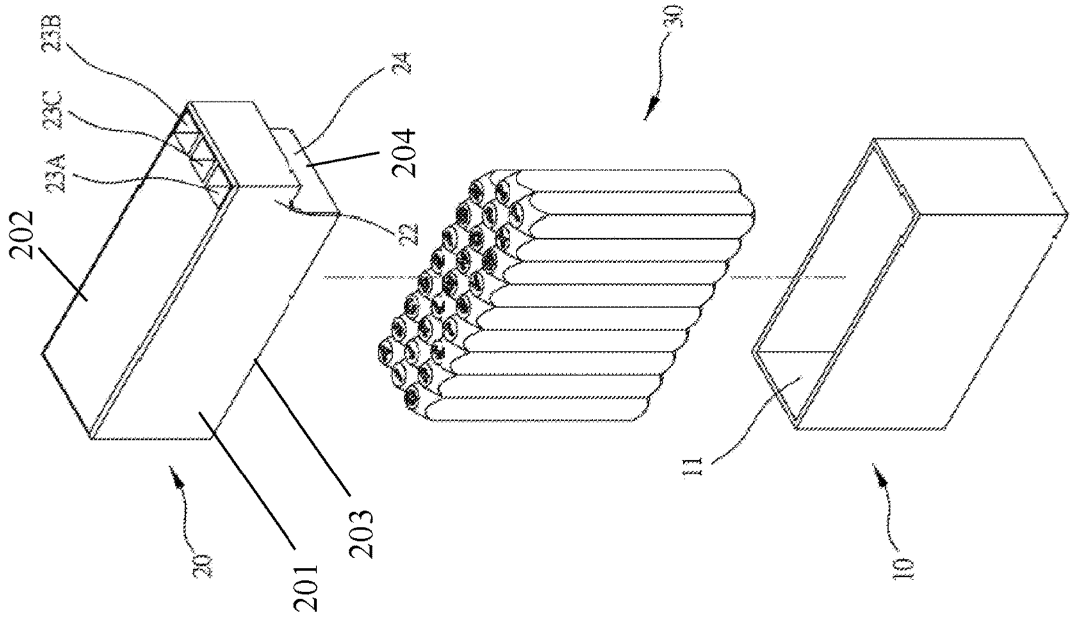
FIG. 9 is an exploded view of the steel stamping tool in FIG. 8.

FIGS. 6 and 7 show that the cover 20 includes two passages 23A, 23B, so that two stamps 30 are picked and extended through the two passages 23A, 23B. FIGS. 8 and 9 show that the cover 20 includes three passages 23A, 23B and 23C, so that three stamps 30 are picked and extended through the two passages 23A, 23B.

Figure 11:
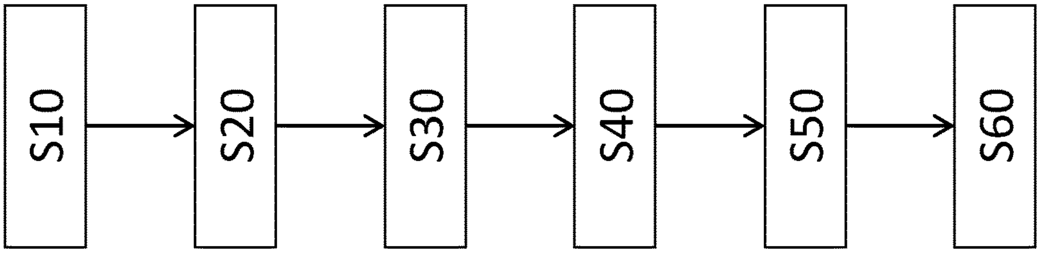
FIG. 11 illustrates the steps of the operational method for the steel stamping tool of the present invention.

As shown in FIG. 11, the present invention also provides an operational method for a steel stamping tool, and the method comprises the following steps:

- a step S10 of separation of the cover 20: removing the cover 20 with an extension 22 from the base 10, the extension 22 having at least one passage 23 defined vertically therethrough;
- a step S20 of positioning of the cover 20: movably positioning the cover 20 on an object "A" and locating the extension 22 above the object "A", a concaved space 24 of the cover 20 formed between the extension 22 and the object "A";
- a step S30 of removing a stamp 30: removing a stamp 30 from the base 10;
- a step S40 of inserting the stamp 30 through the at least one passage 23: inserting the stamp 30 through the at least one passage 23, the stamp 30 being not radially rotatable within the at least one passage 23, the work end of the at least one stamp 30 located in the concaved space 24;
- a step S50 of aiming: holding the cover 20 and moving the cover 20 along the object "A" until the work end of the stamp 30 in the passage 23 aligned with a processing area of the object "A", and
- a step S60 of striking: striking a striking end of the stamp 30 that is exposed on the top face of the extension 22, and the work end of the stamp 30 in the passage 23 embossing the processing area of the object "A".

While we have shown and described the embodiment in accordance with the present invention, it should be clear to those skilled in the art that further embodiments may be made without departing from the scope of the present invention.

What is claimed is:

1. A steel stamping tool comprising:

a base, and a cover removably mounted to a top of the base to form an accommodation space between the base and the cover, multiple stamps accommodated in the accommodating space, each stamp including a striking end and a work end, the cover including an extension extending from one of two ends of the cover, the extension having at least one passage defined vertically therethrough, two holding faces formed on two opposite sides of the cover, a top face formed to a top of the cover, the cover having an open bottom which is located opposite to the top face of the cover, a concaved space formed between the open bottom and the extension, when the cover is removed from the base, one of the stamps is removed from the accommodation space and inserted through the at least one passage, the work end of the stamp extends beyond the at least one passage and is located in the concaved space, the stamp in the passage is not radially rotatable and is in a positioned status, the open bottom of the cover is adapted to be rested on an object, the work end of the stamp is adapted to contact the object.

2. The steel stamping tool as claimed in claim 1, wherein the cover includes an end face that faces the concaved space.

3. The steel stamping tool as claimed in claim 1, wherein a length of the at least one passage is greater than a height of the concaved space.

4. The steel stamping tool as claimed in claim 1, wherein the extension protruded beyond the base when the cover is mounted to the base.

5. An operational method for a steel stamping tool, comprising the following steps:

removing the cover from the base, the cover having with an extension, the extension having at least one passage defined vertically therethrough;

positioning the cover and locating the extension above an object, a concaved space forming a gap between the extension and the object;

removing a stamp from the base;

inserting the stamp through the at least one passage, the stamp being not radially rotatable within the at least one passage, one end of the stamp located in the concaved space;

holding the cover and moving the cover along the object until a work end of the stamp in the passage aligned with a processing area of the object, and striking a striking end of the stamp that is exposed on a top face of the extension and the work end of the stamp in the concaved space embossing the processing area of the object.

6. The operational method as claimed in claim 5, wherein a length of the at least one passage is greater than a height of the concaved space.

* * * * *